United States Patent [19]

Keske

[11] 4,329,000
[45] May 11, 1982

[54] SELF-CONTAINED, DAMPED BALL BEARING ASSEMBLY

[75] Inventor: Frank E. Keske, Chillicothe, Ill.

[73] Assignee: Caterpillar Tractor Co., Peoria, Ill.

[21] Appl. No.: 261,092

[22] PCT Filed: Aug. 28, 1980

[86] PCT No.: PCT/US80/01115
§ 371 Date: Aug. 28, 1980
§ 102(e) Date: Aug. 28, 1980

[87] PCT Pub. No.: WO82/00865
PCT Pub. Date: Mar. 18, 1982

[51] Int. Cl.³ .............................................. F16C 19/08
[52] U.S. Cl. .............................. 308/187; 308/189 A; 308/196; 308/197
[58] Field of Search ................... 308/187, 189 A, 196, 308/197, 236, 189 R, 184 R

[56] References Cited

U.S. PATENT DOCUMENTS

| 958,548 | 5/1910 | Sapp . | |
|---|---|---|---|
| 1,689,930 | 10/1928 | Place | 308/190 |
| 1,886,219 | 11/1932 | Parker | 308/196 |
| 3,304,802 | 2/1967 | Kofink . | |
| 3,532,400 | 10/1970 | Benson et al. | 308/174 |
| 3,561,829 | 2/1971 | Heldt | 308/189 |
| 3,807,815 | 4/1974 | Kasabian | 308/189 |
| 3,909,085 | 9/1975 | Wilkinson et al. | 308/189 |
| 3,980,352 | 9/1976 | Carlson | 308/73 |
| 4,116,506 | 9/1978 | Moritomo et al. | 308/189 A |
| 4,179,247 | 12/1979 | Osborn . | |

FOREIGN PATENT DOCUMENTS

| 293182 | 2/1932 | Italy | 308/197 |
| 556981 | 12/1972 | Switzerland | 308/DIG. 15 |

OTHER PUBLICATIONS

Zehnder, "Development of Turbochargers", etc., 9-1-3-78, p. 1.
Soc. Auto. Eng's., "Turbochargers", etc., Feb. 1979, pp. 102-104.

Primary Examiner—Lenard A. Footland
Attorney, Agent, or Firm—Phillips, Moore, Weissenberger, Lempio & Majestic

[57] ABSTRACT

A self-contained, damped ball bearing assembly (10) for high speed equipment is preloaded to accommodate thermal expansion during operation, is damped to reduce orbiting and shaft whip, and is self-contained so that it can be conveniently incorporated on-the-site into the high speed equipment.

20 Claims, 2 Drawing Figures

SELF-CONTAINED, DAMPED BALL BEARING ASSEMBLY

TECHNICAL FIELD

The present invention pertains to rolling element bearing assemblies, and in particular to ball and bearing assemblies for high speed equipment.

BACKGROUND ART

Bearing assemblies for gas turbines, turbochargers, and other high speed equipment are often required to withstand high rotational speeds as well as high temperatures. Such bearings are subjected to shaft whip, radial play, or sub-harmonic orbiting. Prior art devices include sleeve bearings and associated oil film provided therebetween, which films can damp some of the shaft whip. However, such devices do not always effectively deal with the shaft whip problem and, in addition, the sleeve bearings introduce undesirable friction losses into the assembly.

Preloaded ball bearing assemblies have been used in the past in such high speed equipment in order to eliminate shaft whip or orbital wobbling and axial play and to increase the accuracy of the machine. An example of such a device is reported in an article published by the Society of Automotive Engineers, Inc. entitled "Turbochargers and Turbocharged Engines," Article No. SP-442, February 1979. In that article, a rotor suspension system includes two sets of preloaded ball bearings which provide for the damping of shaft whip and additionally allow for thermal expansion caused by high speeds and hot exhaust gases without affecting the accuracy of the system.

However, this rotor suspension system does not always ensure that damping fluid is properly located between the bearings and housing thereof. Also, this device does not contain a convenient means for ensuring that lubricating fluid is metered to the ball bearings. Further, the system is not self-contained, and thus parts must be assembled separately within the high speed equipment. Such on-the-site assembly always introduces the possibilities of misassembly and contamination from the surrounding environment.

The present invention is directed to overcoming one or more of the problems as set forth above.

DISCLOSURE OF THE INVENTION

In one aspect of the invention, a self-contained rolling element bearing assembly adapted to be inserted into a housing comprises a first set of balls, and a second set of balls. The assembly further includes a common inner race, a common inboard outer race, and first and second outboard outer races. A first retainer associates the first outboard outer race with the common inboard outer race and includes a device for biasing the first outboard outer race toward the inboard outer race. Also included is a second retainer for associating the second outboard outer race with said common inboard outer race and including a device for biasing the second outboard outer race toward the inboard outer race. The assembly further includes means for introducing fluid between the housing and the first and second retainers.

In the above aspect of the invention, the ball bearing assembly is self-contained as the first and second sets of balls share a common inner race which can be used to accommodate the high speed shaft. Further, the assembly provides for proper damping as it allows for the introducing of fluid between the housing and the first and second retainers. The biasing device ensures that the accuracy of the assembly is not affected by thermal expansion.

In another aspect of the invention, a ball bearing assembly comprises an inner race having a pair of inner grooves and an outer race having a pair of outer grooves. Further, means are provided for biasing at least one of the pairs of grooves, i.e. axially preloading the balls in their grooves. A housing is located about and spaced from the outer race and means are provided for introducing fluid into the space between the housing and the outer races. Further, means are provided for bleeding fluid from between the housing and said outer retainer, which means is spaced from the introducing means.

The above another aspect of the invention provides for the damping of shaft whip which can be associated with such devices. Further, the bleeding means ensures that a proper amount of fluid is always available between the housing and the spring retainer for purposes of damping and lubricating.

In yet another aspect of the invention, a check valve is provided for metering fluid into a space between the outer race and the inner race. Such a check valve is convenient and efficient.

Accordingly, the present invention solves the problems of the prior art devices by providing a self-contained bearing assembly which is preloaded to allow for thermal expansion, which is damped to reduce shaft whip associated with such high speed shafts, and which provides a convenient and efficient check valve for allowing proper lubrication of the ball.

BEST MODE OF CARRYING OUT THE INVENTION

Figure 1:
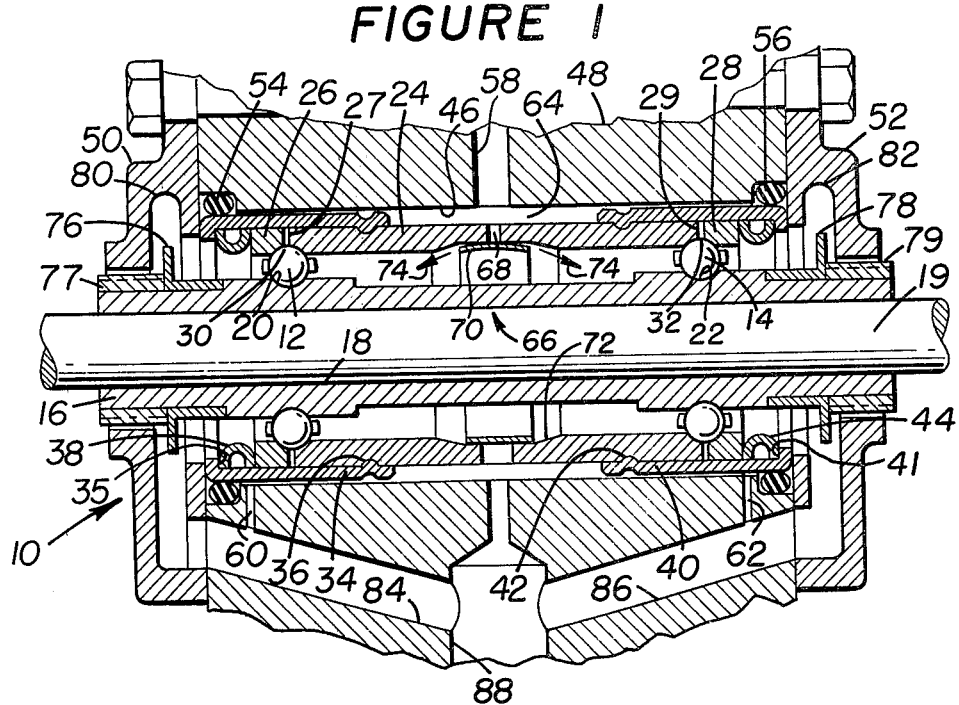
FIG. 1 is a cross-sectional view of an embodiment of the self-contained ball bearing assembly of the invention.

The self-contained ball bearing assembly 10 of the invention is depicted in FIG. 1. The assembly includes a first plurality of balls 12 spaced from a second plurality of balls 14. A common inner race 16 defines a bore 18 adapted for receiving a spindle 19 from, for example, a turbocharger, a gas turbine, a pump, or a compressor. The common inner race 16 defines first and second annular grooves 20 and 22, which receive the first set of balls or roller elements 12 and the second set of balls or roller elements 14, respectively. The cross-sectional diameter of the annular grooves 20 and 22 is larger than the diameter of balls 12 and 14, as will be described further hereinbelow and as can be seen, somewhat exaggerated, in FIG. 2 for balls 14 and groove 22.

Assembly 10 further includes a common inboard outer race 24 and first and second inboard outer races 26 and 28, respectively. Outboard outer races 26 and 28 are positioned adjacent the ends 27 and 29 of inboard outer race 24. Outboard outer race 26 and common inboard outer race 24 define a first groove 30 which receives the first plurality of balls 12 and outboard outer race 28 and inboard outer race 24 define a second groove 32 which receives second plurality of balls 14.

Figure 2:
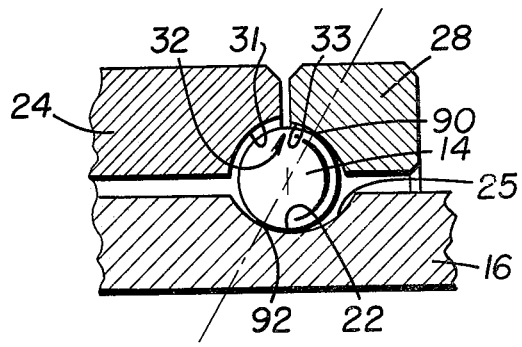
FIG. 2 is an enlarged cross-sectional view of one of the balls of FIG. 1, including portions of the inner race, the outer outboard race, and the outer inboard race.

The cross sectional diameters of grooves 30 and 32 are larger than the diameters of balls 12 and 14. As, for example, annular concave recesses 25, 31 and 33 (FIG. 2) of inner race 16, inboard outer race 24 and outboard outer race 28, are generated by revolving radii larger than the radius of ball 14. The diameter of grooves as shown in FIG. 2 is somewhat exaggerated.

A first annular spring retainer 34 is positioned about outboard outer race 26 and inboard outer race 24 and crimped to inboard outer race 24 at point 36. Spring retainer 34 holds a spring 38 against seat 35 thereof, which spring 38 biases outboard outer race 26 toward inboard outer race 24. As shown in FIG. 1, spring 36 is a horseshoe spring (U-shaped in cross-section). It is to be understood that other types of springs, such as helical coil springs, wave springs, and Belleville springs can also be used. A second spring retainer 40 is positioned about inboard outer race 24 and second outboard outer race 28 and is crimped to inboard outer race 24 at point 42. A second spring 44 is retained by spring retainer 40 against seat 41 thereof and urges second outboard outer race 28 toward inboard outer race 24. Spring 44 is similar to spring 36.

Retainers 34 and 40 are received in a bore 46 defined by housing 48, which housing 48 is associated with the turbocharger or other such equipment. Housing 48 includes first and second end covers 50 and 52. Housing 48 also receives O-ring seals 54 and 56, which can be comprised of elastomeric materials or other materials well known in the art, and which are compressed against spring retainers 34 and 40, respectively, to form a sealing relationship between housing 48 and retainers 34 and 40. In a preferred embodiment, there is a clearance of between 0.001 and 0.002 inches (0.0254 and 0.0508 mm) between the spring retainers 34 and 40 and the bore 46. This clearance is filled with lubricating and damping fluid, as will be described below, in order to dampen any shaft whip which can occur.

Housing 48 defines an oil or lubricating and damping fluid feedline 58 which provides fluid from a high pressure source (not shown). Housing 48 also defines air and fluid bleed holes or conduits 60 and 62 which are located adjacent and inboard of O-ring seals 54 and 56, respectively. The high pressure fluid can form a damping film between the spring retainers 38 and 40 and the housing bore 46, and excess fluid and air can be bled through bleed holes 60 and 62 to ensure that the above clearance is completely filled with damping and lubricating fluid. An annular cavity 64 is defined between spring retainers 34 and 40 and housing 48 and common inboard outer race 24. This cavity 64, as is evident in FIG. 1, communicates with oil feedline 58 and also with a check valve means 66 which meters fluid to first and second plurality of balls 12 and 14, respectively. Check valve means 66 includes an aperture or bore 68 which is defined by common inboard outer race 24 and a leaf spring 70. Leaf spring 70 is essentially formed in the shape of a ring and can be inserted in groove 72 defined by inboard outer race 24. Leaf spring 70 covers aperture 68 and maintains a certain predetermined fluid pressure in cavity 64 so that the above damping clearances are always filled with damping and lubricating fluid. The arrows 74 in FIG. 1 indicate that the pressure in cavity 46 is generally always great enough to cause the leaf spring 70 to flex, allowing oil to squirt or drop from check valve means 66 in order to lubricate the plurality of balls 12 and 14. Thus, the valve also acts to meter a preselected supply of lubricating fluid to the balls 12 and 14. The fluid, after lubricating the balls 12 and 14, travels outboard thereof, where it is thrown by first and second annular slingers 76 and 78 into collector grooves 80 and 82, which are defined by end covers 50 and 52, respectively. Oil slingers 76 and 78 are L-shaped in cross-section and are mounted to the common inner race 16 outboard of the first and second plurality of balls 12 and 14, respectively. Slingers 76 and 78 are held in place on common inner race 16 by end retaining nuts 77 and 79, respectively. Collector grooves 80 and 82 are annular and communicate with fluid resin channels 84 and 86, which are defined by housing 48 and which communicate with fluid drain 88. Bleed holes 60 and 62 also communicate with channels 84 and 86, respectively.

In FIG. 2, the upper right hand portion of assembly 10 including ball 14 is shown enlarged. As the outboard outer race 28 is biased leftwardly toward inboard outer race 24, the ball 14 contacts race 28 at point 90 and common inner race 16 at point 92, due to the fact that, as previously described, the diameters of the grooves 22 and 32 are slightly greater than the diameter of the ball 14. Accordingly, a line of contact can be established between the balls and the grooves under an axial or a thrust load.

INDUSTRIAL APPLICABILITY

The operation of the ball bearing assembly 10 is as follows. With the ball bearing assembly 10 applied to a high-speed spindle or shaft, as, for example, that of a gas turbine or turbocharger, the inner race 16 can revolve at a very high speed. Accordingly, the temperature of the assembly 10 rises quite rapidly due to the rapid speed of revolution and also due to heat which flows from, for example, a hot turbine through the shaft or spindle 19. The common inner race expands and forces the outboard outer races 26 and 28 to move axially away from the common inboard outer race 24. In so doing, the springs 38 and 44 are compressed. Thus, the assembly 10 is not overstressed and the accuracy in positioning the center of rotation, clearance and efficiency necessary for high speed shaft operation is maintained as radial expansion is kept to a minimum.

As such a high speed shaft or spindle experiences shaft whip or orbital wobbling, the above assembly 10 keeps such shaft whip to a minimum by having a continuous damping film provided between retainers 34 and 40 and the housing 48. The air bleed holes 60 and 62 ensure that this film is continuous and completely fills the clearance.

The check valve means 66 of assembly 10 is efficient, convenient and only allows the required amount of lubricating fluid to flow to the first and second plurality of balls 12 and 14, while still maintaining sufficient pressure in cavity 64 to ensure that there is proper damping between the retainers 34 and 40 and the bore 46 of housing 48.

Additionally, it is noted that the assembly 10 is self-contained. The assembly 10 can be inserted into housing 48 by first removing one of the end covers 50,52. Then assembly 10 is disposed into bore 46 and one of the end covers 50,52 is replaced. The shaft of the gas turbine or like can then be disposed through the bore 18 of the common inner race 16 to accomplish proper mounting thereof. Thus, the assembly 10 can be preassembled under ideal working conditions and incorporated in the appropriate machinery as needed without having to be assembled at the site of the machinery. Accordingly, errors due to improper on-site assembly and contamination from the surrounding environment can be minimized.

The aspects, objects, and advantages of this invention can be obtained from a study of the drawings, the disclosure, and the appended claims.

What is claimed is:

1. A self-contained bearing assembly (10) comprising:
    an inboard outer race (24) having first and second ends (27,29);
    first and second outboard outer races (26,28);
    first and second sets of rolling elements (12,24);
    inner race means (16) for rollingly supporting said first and second sets of rolling elements (12,14);
    first retainer means (34,38) for resiliently biasing said first outboard outer race (26) toward said first end (27) of said inboard outer race (24) with said first set of rolling elements (12) therebetween, said first retainer means (34,38) being connected to said inboard outer race (24); and
    second retainer means (40,44) for resiliently biasing said second outboard outer race (28) toward said second end (29) of said inboard outer race (24) with said second set of rolling elements (14) therebetween, said second retainer means (40,44) being connected to said inboard outer race (24).

2. The bearing assembly (10) of claim 1 including a housing (48) and mounting means (46,50,52) for mounting said first and second retainer means (34,38,40,44) within said housing (48).

3. The bearing assembly (10) of claim 2 wherein said mounting means (46,50,52) includes means (58) for introducing a fluid between said housing (48) and said first and second retainer means (34,38,40,44) and effecting fluid damping thereof.

4. The bearing assembly (10) of claim 3 including means (60,62) for bleeding fluid from between said housing (48) and said first and second retainer means (34,38,40,44).

5. The bearing assembly (10) of claim 4 including a cavity (64) defined between said housing (48) and said inboard outer race (24), said introducing means (58) directing fluid to said cavity (64) and axially outwardly to said bleeding means (60,62).

6. The bearing assembly (10) of claim 5 wherein said inner race means (16) is a common inner race (16) defining first and second grooves (20,22) for respectively supporting said first and second sets of rolling elements (12,14).

7. The bearing assembly (10) of claim 1 wherein said inner race means (16) is a common inner race (16) defining first and second grooves (20,22) for respectively supporting said first and second sets of rolling elements (12,14).

8. The bearing assembly (10) of claim 1 including check valve means (66) for metering a fluid to said first and second sets of rolling elements (12,14).

9. The bearing assembly (10) of claim 8 wherein said check valve means (66) includes an orifice (68) defined in said inboard outer race (24).

10. The bearing assembly (10) of claim 9 wherein said check valve means (66) includes an annular leaf spring (70) having a radially outwardly bias against said orifice.

11. The bearing assembly (10) of claim 1 wherein said first and second retainer means (34,38,40,44) individually include an annular retainer (34,40) having a seat (35,41) and a spring (38,44) retained on the seat (35,41).

12. The bearing assembly (10) of claim 11 wherein said retainers (34,40) are individually connected to said inboard outer race (24) by a crimp (36,42).

13. The bearing assembly (10) of claim 12 wherein each of said springs (38,44) is an annular spring having a U-shaped cross section.

14. The bearing assembly (10) of claim 1 wherein each of said first and second sets of rolling elements (12,14) is a plurality of spherical ball bearings (12,14).

15. The bearing assembly (10) of claim 14 wherein said inboard outer race (24), said first and second outboard outer races (26,28) and said inner race means (16) each define an annular concave recess (25,31,33) generated by revolving radii larger than said ball bearings (12,14).

16. A self-contained rolling element bearing assembly (10) adapted to be inserted into and spaced from a housing (48) comprising:
    a first set of rolling elements (12);
    a second set of rolling elements (14);
    a common inner race (16);
    a common inboard outer race (24) with a first end (27) and a second end (29);
    a first outboard outer race (26);
    a second outboard outer race (28);
    first retainer means (34) for associating said first outboard outer race (26) with said first end (27), including means (36) for biasing said first outboard outer race (26) toward said inboard outer race (24);
    second retainer means (40) for associating said second outboard outer race (28) with said second end (29), including means (44) for biasing said second outboard outer race (28) toward said inboard outer race (24); and
    means (58) for introducing fluid between the housing (48) and said first and second retainer means (34,40).

17. The assembly (10) of claim 16 including means (60,62) for bleeding fluid from between said housing (48) and said first and second spring retainer means (34,40), which is spaced from said introducing means (58).

18. The assembly (10) of claim 17 wherein said introducing means (58) is located between said first and second sets of rolling elements (12,14) and wherein said bleeding means (60,62) includes a first passage (60) located outboard of said first set of rolling elements (12) and a second passage (62) located outboard of said second set of rolling elements (14).

19. The assembly (10) of claim 16 including:
    means (66) for metering the fluid to said first and second sets of rolling elements (12,14) including an orifice (68) defined in said inboard outer race (24) and a leaf spring (70) biased against said orifice (68).

20. The assembly (10) of claim 16 including:
    check valve means (66) for metering the fluid to said first and second sets of rolling elements (12,14).

* * * * *